(12) United States Patent
Lueghamer et al.

(10) Patent No.: US 12,214,557 B2
(45) Date of Patent: Feb. 4, 2025

(54) WELDABLE CONNECTING ELEMENT FOR CONNECTING OR JOINING THERMOPLASTIC LINE ELEMENTS, AND A WELDING ASSEMBLY AND A METHOD FOR PRODUCING A WELDED CONNECTION

(71) Applicant: agru Kunststofftechnik Gesellschaft m.b.H., Bad Hall (AT)

(72) Inventors: Albert Lueghamer, Sierning (AT); Gerald Severa, Bad Hall (AT)

(73) Assignee: agru Kunststofftechnik Gesellschaft m.b.H., Bad Hall (AT)

( * ) Notice: Subject to any disclaimer, the term of this patent is extended or adjusted under 35 U.S.C. 154(b) by 771 days.

(21) Appl. No.: 17/442,496

(22) PCT Filed: Mar. 25, 2019

(86) PCT No.: PCT/AT2019/060101
§ 371 (c)(1),
(2) Date: Sep. 23, 2021

(87) PCT Pub. No.: WO2019/136508
PCT Pub. Date: Jul. 18, 2019

(65) Prior Publication Data
US 2022/0152941 A1    May 19, 2022

(51) Int. Cl.
*B29C 65/34* (2006.01)
*B29C 65/00* (2006.01)
(Continued)

(52) U.S. Cl.
CPC ...... *B29C 65/3468* (2013.01); *B29C 65/3424* (2013.01); *B29C 66/9672* (2013.01);
(Continued)

(58) Field of Classification Search
CPC .............. B29C 65/342; B29C 65/3424; B29C 65/3468; B29C 65/7832; B29C 65/7841;
(Continued)

(56) References Cited

U.S. PATENT DOCUMENTS

| 4,703,150 A | 10/1987 | Kunnecke et al. |
| 5,150,923 A * | 9/1992 | Ohya ................ B29C 66/91221 285/21.2 |
| 2001/0023869 A1 * | 9/2001 | Sauron ................ B29C 66/9441 219/535 |

(Continued)

FOREIGN PATENT DOCUMENTS

| CH | 553 368 A | 8/1974 |
| CH | 601 719 A5 | 7/1978 |

(Continued)

OTHER PUBLICATIONS

International Search Report in PCT/AT2019/060101, mailed Nov. 28, 2019.

*Primary Examiner* — Helena Kosanovic
*Assistant Examiner* — Joe E Mills, Jr.
(74) *Attorney, Agent, or Firm* — Collard Roe, P.C.

(57) ABSTRACT

The invention relates to a weldable connecting element 2 for connecting or joining thermo-plastic line elements 3. The connecting element 2 comprises:
a thermoplastic body 4;
at least one heating element 6, which is embedded in the body 4, wherein the heating element 6 serves to generate heat in a welding area 5 for welding the body 4 to the at least one line element 3. Furthermore, a joining control 12 is provided, which is configured to prohibit the welding operation and/or to interrupt the welding operation if the body 4 and the line element 3 are not joined correctly.

21 Claims, 4 Drawing Sheets

(51) Int. Cl.
*B29K 101/12* (2006.01)
*B29L 23/00* (2006.01)
*F16L 47/03* (2006.01)

(52) U.S. Cl.
CPC .............. *B29C 66/97* (2013.01); *F16L 47/03* (2013.01); *B29K 2101/12* (2013.01); *B29L 2023/22* (2013.01)

(58) Field of Classification Search
CPC ............ B29C 66/1222; B29C 66/5221; B29C 66/52292; B29C 66/73921; B29C 66/872; B29C 66/9672; B29C 66/97; B29K 2101/12; B29L 2023/22; F16L 47/03
See application file for complete search history.

(56) References Cited

U.S. PATENT DOCUMENTS

2015/0210823 A1\* 7/2015 Uliel ................ B29C 66/73921
285/21.2

FOREIGN PATENT DOCUMENTS

| | | |
|---|---|---|
| CH | 632 078 A5 | 9/1982 |
| DE | 28 48 382 A1 | 3/1980 |
| DE | 102 25 370 A1 | 12/2003 |
| EP | 0 173 174 A1 | 3/1986 |
| EP | 1 745 917 A1 | 1/2007 |
| EP | 1 369 636 B1 | 10/2010 |
| JP | H06-331087 A | 11/1994 |
| JP | 2005-069445 A | 3/2005 |

\* cited by examiner

WELDABLE CONNECTING ELEMENT FOR CONNECTING OR JOINING THERMOPLASTIC LINE ELEMENTS, AND A WELDING ASSEMBLY AND A METHOD FOR PRODUCING A WELDED CONNECTION

CROSS REFERENCE TO RELATED APPLICATIONS

This application is the National Stage of PCT/AT2019/060101 filed on Mar. 25, 2019, the disclosure of which is incorporated by reference. The international application under PCT article 21(2) was not published in English.

The invention relates to a weldable connecting element for connecting or joining thermo-plastic line elements, and a welding assembly and a method for producing a welded connection.

Connecting line elements made from a thermoplastic with the aid of a connecting element that is also thermoplastic and is provided with a heating element is generally known. In this context, line elements are understood to be pipeline parts, fittings, and shaped parts, which are joined by the connecting elements to form lines and line networks. The connecting elements are, in this regard, often formed as electric welding sockets and as electrically weldable connecting clamps and clamp saddles. However, the connecting elements may also be used to connect other elements than pipeline elements, e.g. for joining rod parts, although using weldable connecting elements in the field of pipeline construction is one of the most common fields of application. In order for the connection of line elements by means of such connecting elements to take place reliably, the welding is required to be checked. EP 0 173 174 A1 proceeds on the assumption that the quality of the welding essentially depends on the right temperature in the welding area and the welding pressure occurring during the welding operation, i.e. on the pressure which is applied to the material in the welding zone plasticized by the added heat. This pressure occurs because the connecting element is given a shrinking provision, which is realized as a shrinking of the connecting element due to the added heat when the welding area is plasticized. This shrinking in combination with the volume increase of the material upon heating the welding area causes this pressure increase in the welding area.

As all circumstances that prevent reaching the right welding temperature and welding pressure constitute a reduction in the quality of the welded connection, the connecting elements have been provided with additional display means meant to provide information on the quality of the welding for a long time now.

In a known display device, a color change point is used, which is applied to the outer socket surface and changes its color upon sufficient heating of the body of the connecting element. In order to achieve a better temperature indication, it is known from CH-PS 553 368 to arrange the color change point at a location with a smaller wall thickness. But in this case, as well, only the temperature can be determined but not the welding pressure, and in addition, it is possible that the color may change due to external thermal influence.

As the temperature indication on the connecting device alone does not allow reliable conclusions regarding the quality of the welding, solutions have become known, in which the pressure occurring in the welding area of the welding is made visible. In this regard, flaws in the body of the connecting element can be provided, which bulge due to the occurring welding pressure. It is furthermore known from CH-PS 632 078 to provide recesses, the base of which ends near the welding area. Said recesses fill up with more or less plastic material during the welding operation, and thus indicate whether a sufficient welding pressure with an appropriate temperature is present in the welding area. An improvement of this quality indication for the welding, known from CH-PS 601 719 consists in that a pin is arranged in the bore. Said pin rises above the socket surface and can therefore be noticed easily when the welding pressure occurs. This embodiment has proven useful in particular in the case of connecting elements having relatively thin walls. The emerging pin constitutes a relatively precise measurement for the temperature and the welding pressure in the welding area. However, in the case of higher welding pressures, as they are common in connecting elements with thicker walls, this embodiment has the disadvantage that the depth of the bore is difficult to determine. If the base of the bore is too close to the welding area, the movement of the pin takes place too early, however, if the base of the bore is arranged at a distance from the welding area, the pin does not move although pressure has developed.

EP 1 745 917 A1 and DE 10 225 370A1, as well, each disclose electric welding sockets made of thermoplastic materials for pipeline connections, wherein the electric welding socket can be connected to a pipeline by means of an electric welding method. In order to establish the connection, a heating wire winding embedded in the electric welding socket is connected to an external electric power source, whereby the electric welding socket is melted in some regions.

The electric welding sockets known from the prior art have the disadvantage that if the pipe is not sufficiently inserted into the electric welding socket, no sufficient connection between the pipe and the electric welding socket can be established. This leads to leaky pipe connections.

Moreover, a pipe insufficiently inserted into the electric welding socket may lead to localized overheating of the electric welding socket, which, in the worst case, may even lead to fire. In electric welding sockets known from the prior art, an indicator for checking the correct positioning of the individual elements relative to one another is achieved only unsatisfactorily.

The object of the present invention was to overcome the disadvantages of the prior art and to provide an improved connecting element and an improved method for welding connecting elements together.

This object is achieved by means of a device and a method according to the claims.

According to the invention, a weldable connecting element for connecting or joining thermo-plastic line elements is formed. The connecting element comprises:
 a thermoplastic body;
 at least one heating element, which is embedded in the body, wherein the heating element serves to generate heat for welding the body to the at least one line element in a welding area. Furthermore, a joining control is provided, which is configured to prohibit the welding operation and/or to interrupt the welding operation if the body and the line element are not joined correctly.

The connecting element according to the invention has the advantage that a correct joining of the connecting element and the line elements is not checked only in the final welded state but can be checked before the start of the welding operation and/or during the welding operation. This particularly entails the advantage that less waste material is produced, as the welding is not even started if the connecting element and the joining element are not joined correctly. Moreover, safety risks, such as a fire risk, upon starting the welding operation can surprisingly be prevented by the features according to the invention if the components are not joined correctly.

Furthermore, it may be useful if the heating element is configured in the form of a resistance heating wire, wherein the joining control comprises an interruption in the resistance heating wire and a bridging element for closing the interruption, wherein the bridging element is arranged in the body such that the interruption is closed when the line element is correctly joined with the connecting element. Such an interruption in the resistance heating wire entails the advantage that the welding machine used does not require additional sensors in order to detect the correct assembly of the connecting element and the line element. Thus, common welding machines may be used, which allows the connecting elements to be used widely with increased safety. Moreover, such an interruption in the resistance heating wire is easy and cost-efficient to produce.

Furthermore, it may be provided that a stop is formed in the body, which stop serves as an insertion limit for the line element, wherein the bridging element is configured in the form of an electrically conductive spring element, which is arranged in the stop. A bridging element formed in such a way, in particular, has a simple and therefore less error-prone structure. Moreover, a bridging element formed in such a way entails the surprising advantage that the function of the bridging element cannot be bypassed and/or that no separate precautions must be taken during the individual steps of the joining operation and/or welding operation, in order to detect the correct joining of the connecting element and the line element.

Moreover, it may be provided that the bridging element is configured in the form of an electrically conductive spring element, which is arranged at an inner circumference of the welding area and acts in the radial direction. A bridging element formed in such a way, in particular, has a simple and therefore less error-prone structure. Moreover, a bridging element formed in such a way entails the surprising advantage that the function of the bridging element cannot be bypassed and/or that no separate precautions must be taken during the individual steps of the joining operation and/or welding operation, in order to detect the correct joining of the connecting element and the line element.

An embodiment according to which it may be provided that the bridging element is formed by a conductive material strip, which can be applied on the line element, in particular that a stop is formed in the body, which stop serves as an insertion limit for the line element and has a first contact and a second contact offset in the circumferential direction, and the material strip can be applied on the front side of the line element and serves to electrically connect the first contact to the second contact, is also advantageous. Such a bridging element may have a simple structure and is easy to apply in the joining operation and/or in the production operation of the welded connection.

According to an advancement, it is possible that at least one shaped element, in particular a recess, is formed on the body, which shaped element serves to accommodate a sensor of the joining control. This entails the advantage that when using a sensor as a joining control, the position of the sensor is exactly defined and hence, possible operating errors are impeded as much as possible.

Furthermore, it may be useful if at least two shaped elements, in particular recesses, which are axially spaced apart from one another, are formed on the body, each of which serves to accommodate a sensor of the joining control. This entails the advantage that for a connecting element, which connects two line elements, one sensor for each of the line elements may be formed, which sensor may serve to detect the correct position and/or the correct joining of the connecting element of the line elements.

According to the invention, a welding assembly is provided. The welding assembly comprises:
at least one thermoplastic line element;
a connecting element, which has a thermoplastic body, wherein a heating element is embedded in the body, which serves to generate heat in a welding area for welding the body to the at least one line element;
a welding device for welding the connecting element to the at least one thermoplastic line element.

Furthermore, a joining control is provided, which is configured to prohibit the welding operation and/or to interrupt the welding operation if the body and the line element are not joined correctly.

The welding assembly according to the invention has the advantage that a correct joining of the connecting element and the line elements is not checked only in the final welded state but can be checked before the start of the welding operation and/or during the welding operation. This particularly entails the advantage that less waste material is produced, as the welding is not even started if the connecting element and the joining element are not joined correctly.

Moreover, safety risks, such as a fire risk, upon starting the welding operation can surprisingly be prevented by the features according to the invention if the components are not joined correctly.

Furthermore, it may be provided that the joining control comprises a sensor, which is arranged or can be arranged on the body of the connecting element, and that the joining control comprises a sensor counter-element, which is arranged or can be arranged on the line element, wherein the sensor can be coupled to the welding device, and the welding device is configured to start and/or carry out the welding operation dependent on a correct position of the sensor counter-element relative to the sensor. This entails the advantage that the connecting element does not have to have additional components in order to realize the joining control.

According to a particular embodiment, it is possible that a joining device is formed, which serves to position the at least one line element relative to the connecting element, and that the joining control comprises a sensor, which is arranged or can be arranged on the joining device, and that the joining control comprises a sensor counter-element, which is arranged or can be arranged on the line element, wherein the sensor can be coupled to the welding device, and the welding device is configured to start and/or carry out the welding operation dependent on a correct positioning of the sensor counter-element relative to the sensor. Because the welding of many types of connecting elements requires a joining device anyway, it has proven surprisingly simple if said joining device simultaneously serves to accommodate and/or apply a sensor.

According to an advantageous advancement, it may be provided that the sensor is configured in the form of an RFID module, and that the sensor counter-element is configured in the form of an RFID tag. Such an RFID solution, in particular, may have a simple and reliably structure.

In particular, it may be advantageous if the sensor is configured in the form of a Hall sensor, and that the sensor counter-element is configured in the form of a magnet element. Such a Hall sensor solution, in particular, may have a simple and reliably structure. Moreover, a distance of the sensor counter-element from the sensor can be easily detected by means of the Hall sensor.

Furthermore, it is also conceivable that the sensor is configured in the form of an inductive sensor or of any other sensor.

Furthermore, it may be provided that the sensor is configured in the form of an optical sensor, and that the sensor counter-element is configured in the form of a reflector. Such a Hall sensor solution, in particular, may have a simple and reliably structure.

Moreover, it may be provided that the joining control comprises an ultrasonic sensor, in particular that the ultrasonic sensor is coupled to the welding device. Using an ultrasonic sensor offers the surprising advantage that no sensor counter-element has to be arranged on the line element, whereby this source of error in the joining operation can be eliminated. Moreover, a joining control by means of an ultrasonic sensor is easy to realize. Moreover, a joining control by means of an ultrasonic sensor may have a high degree of reliability.

In particular, it may be provided that the ultrasonic sensor serves to detect the wall thickness of the connecting element, wherein when a line element is present, a greater wall thickness is detected and thus, when the ultrasonic sensor is positioned correctly, a correct joining of the line element and the connecting element can be inferred.

An embodiment according to which it may be provided that at least one shaped element, in particular a recess, is formed on the body, which shaped element serves to accommodate the sensor, is also advantageous. This entails the advantage that when using a sensor as a joining control, the position of the sensor is exactly defined and hence, possible operating errors are impeded as much as possible.

According to an advancement, it is possible that at least two shaped elements, in particular recesses, which are axially spaced apart from one another, are formed on the body, each of which serves to accommodate the sensor. This entails the advantage that for a connecting element, which connects two line elements, one sensor for each of the line elements may be formed, which sensor may serve to detect the correct position and/or the correct joining of the connecting element of the line elements.

According to the invention, a method for connecting or joining thermoplastic line elements to a connecting element is provided. The method comprises the method steps:
  providing the at least one thermoplastic line element;
  providing the connecting element, which has a thermoplastic body, wherein a heating element is embedded in the body, which serves to generate heat in a welding area for welding the body to the at least one line element;
  joining the connecting element with the at least one thermoplastic line element;
  providing a welding device for welding the connecting element to the at least one thermo-plastic line element;
  welding the connecting element to the at least one thermoplastic line element by generating heat in the welding area by means of the welding device.

The welding operation is started or resumed only if a correct connection between the body and the at least one thermoplastic line element is determined by means of a joining control.

The method according to the invention offers the advantage that a correct joining of the connecting element and the line elements is not checked only in the final welded state but can be checked before the start of the welding operation and/or during the welding operation. This particularly entails the advantage that less waste material is produced, as the welding is not even started if the connecting element and the joining element are not joined correctly. Moreover, safety risks, such as a fire risk, upon starting the welding operation can surprisingly be prevented by the features according to the invention if the components are not joined correctly.

Moreover, it may be provided that the joining control establishes a connection in an interruption of a resistance heating wire if the line element is correctly joined with the connecting element. Such a connection of an interruption can be easily detected.

Furthermore, it may be provided that the welding device detects an interruption of the resistance heating wire and issues an error message.

According to a particular embodiment, it is possible that the joining control comprises a sensor, which is coupled to the welding device, wherein the correct connection of the connecting element and the line element is retrieved by the welding device by means of the sensor before the start of the welding operation and/or during the welding operation. This particularly entails the advantage that the welding operation can be carried out dependent on the sensor signal. Hence, the welding operation can be interrupted immediately when the correct positioning of the line elements and the connecting element is no longer given.

The mentioned features and independent approaches achieve the common object of the invention.

An ultrasonic sensor may have both a transmitter and a receiver, which are united in the ultrasonic sensor structural unit. Such an ultrasonic sensor is used especially when the transmitter built into the ultrasonic sensor can be positioned normal to the surface of the object to be measured, and the ultrasonic waves are thus reflected back to the same position.

In particular, it may be provided that an ultrasonic device has a first ultrasonic sensor, which, in a transmission mode, transmits an ultrasonic wave to an object, and in a receiving mode, receives an echo of the ultrasonic wave reflected from the object. Furthermore, the sensor head has at least a second ultrasonic sensor, which is arranged near the first ultrasonic sensor and receives an echo of the ultrasonic wave reflected by the object. An ultrasonic device may moreover comprise a control unit, which calculates a distance signal in respect of the object using a first distance signal, which is issued based on the echo received by the first ultrasonic sensor, and a second distance signal, which is issued by the second ultrasonic sensor if the first ultrasonic device is set in the receiving mode.

Furthermore, it may be provided that the shaped element serves to accommodate a transmitter and/or a receiver and/or a sensor head of an ultrasonic device.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
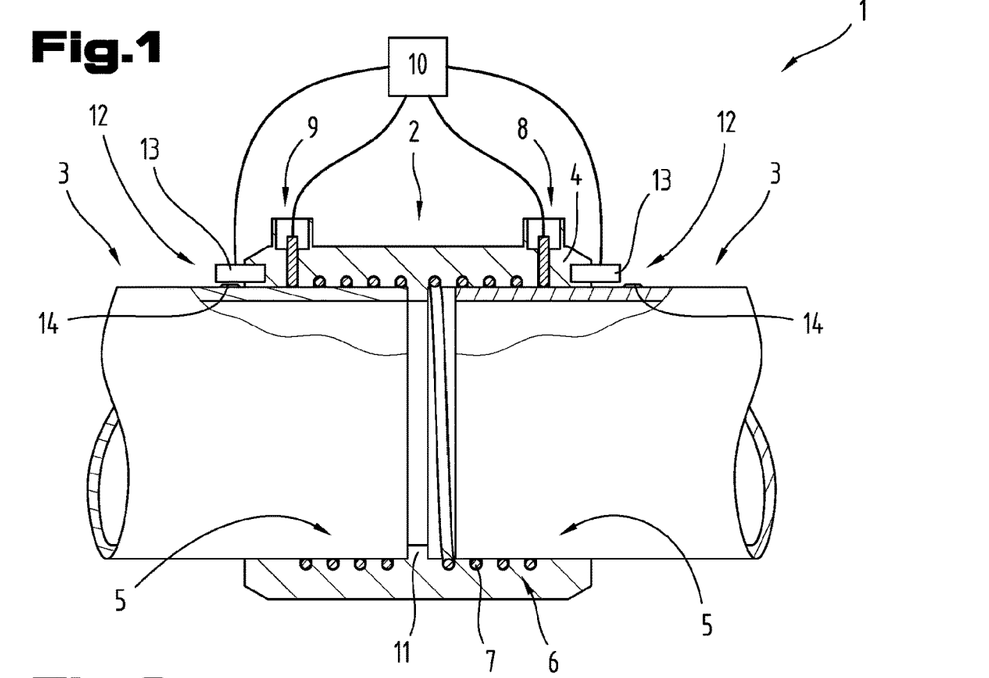
FIG. 1 a sectional view of an exemplary embodiment of a connecting element with a sensor and a sensor counter-element.

FIG. 1 shows a first exemplary embodiment of a welding assembly 1 with a connecting element 2 for connecting line elements 3.

In the exemplary embodiment according to FIG. 1, the connecting element 2 is configured in the form of an electric welding socket, and the line elements 3 are configured in the form of pipelines.

As can be seen in FIG. 1, it may be provided that the connecting element 2 has a thermo-plastic body 4, in which a heating element 6 is arranged in a welding area 5. The heating element 6 may in particular be configured in the form of a resistance heating wire 7.

For example, it is conceivable that the connecting element 2 serves to connect two line elements 3 and hence, two welding areas 5 are formed in the body 4 of the connecting element 2.

In this regard, one of the welding areas 5 serves to weld the connecting element 2 to the first line element, and a second one of the welding areas 5 serves, in this regard, to weld the connecting element 2 to the second line element 3.

As can further be seen in FIG. 1, it may be provided that the heating element 6 has a first connection point 8 and a second connection point 9, each of which serves to connect to a welding device 10. The two connection points 8, 9 may be formed, as shown in FIG. 1, in the region of the two longitudinal ends of the connecting element 2, wherein both welding areas 5 can be heated simultaneously by means of the welding device 10.

Furthermore, it is also conceivable that for each welding area 5, a first connection point 8 and a second connection point 9 for the welding device 10 are formed. This makes possible that each of the two welding areas 5 can be heated individually and independently of each other, and a welded connection can be produced separately between the connecting element 2 and the first line element 3 and between the connecting element 2 and the second line element 3.

As can further be seen in FIG. 1, it may be provided that a stop 11 is formed on the body 4 of the connecting element 2, which stop 11 serves to correctly position the two line elements 3 in the connecting element 2. The stop 11 may be formed centrally in the connecting element 2.

Furthermore, a joining control 12 is formed, which is configured to prohibit the welding operation and/or to interrupt the welding operation if the body 4 and the line element 3 are not joined correctly.

As can be seen in the exemplary embodiment according to FIG. 1, it may be provided that the joining control 12 comprises a sensor 13 and a sensor counter-element 14. In particular, it may be provided that for each of the line elements 3, a separate sensor 13 and/or a separate sensor counter-element 14 is formed.

Furthermore, it may be provided that a shaped element 15 for accommodating the sensor 13 is formed on the body 4 of the connecting element 2. In particular, it may be provided that the shaped element 15 serves for an interlocking accommodation of the sensor 13, whereby the position of the sensor 13 can be exactly defined. In particular, it may be provided that the shaped element 15 tool is configured in the form of a recess. The sensor counter-element 14 may be applied on the line element 3.

Furthermore, it may be provided that the sensor or the sensors 13 are connected to the welding device 10, whereby a welding is made possible depending on the joining control 12. The sensor 13 may be formed such that it can detect a certain position of the sensor counter-element 14.

If the sensor 13 is configured in the form of an RFID module, it is conceivable, for example, that by means of the functionality of the RFID module, the distance from the sensor counter-element 14 in the form of an RFID tag can be determined. Thus, the relative position of the RFID module and the RFID tag relative to one another can be determined.

If the sensor 13 is configured in the form of an Hall sensor, it is conceivable, for example, that by means of the functionality of the Hall sensor, the distance from the sensor counter-element 14 in the form of a magnet element can be determined. Thus, the relative position of the Hall sensor and the magnet element relative to one another can be determined.

If the sensor 13 is configured in the form of an optical sensor, it may be provided, for example, that it detects if the sensor counter-element 14, which is configured in the form of a reflector, is located at a particular position.

The welding operation for joining the connecting element 2 with the line elements 3 may comprise the following method steps, wherein they may also be carried out in a different order.

In a first method step, it may be provided that the connecting element 2 and the line elements 3 are provided, wherein the line elements 3 may be prepared for being welded to the connecting element 2 in accordance with the known welding methods.

In a further method step, the welding device 10 is provided, wherein electrical connections between the welding device 10 are connected to the first connection point 8 and the second connection point 9. Furthermore, the sensors 13 may be arranged on the connecting element 2 on the shaped elements 15 provided therefor and also be coupled to the welding device 10.

Furthermore, the sensor counter-elements 14 may be arranged on the line elements 3 in accordance with the necessary insertion depth.

Subsequently, the line elements 3 may be joined with the connecting element 2. In this process, the line elements 3 can be inserted in the connecting element 2 until the line elements 3 abut on the stop 11.

By means of the sensors 13, it can be detected whether the line elements 3 are correctly joined with the connecting element 2, wherein the welding operation can be started and/or carried out based on this information.

In particular, it may be provided that the welding operation is only started if the correct position of the line elements 3 is detected by means of the sensors 13.

Furthermore, it is also conceivable that the correct position of the line elements 3 is detected during the welding operation by means of the sensors 13, and the welding operation is terminated if the line elements 3 move out of their correct position relative to the connecting element 2 during welding. As an alternative to this, it is of course also conceivable that the welding operation is not terminated but that the welding device 10 issues an alarm signal, so that an operator has the opportunity to correct the position of the line elements 3 relative to the connecting element 2. This opportunity to correct the position may last for a certain time period. If the line elements 3 are not put into their correct position relative to the connecting element 2 within this time, the welding operation may be terminated.

Figure 2:
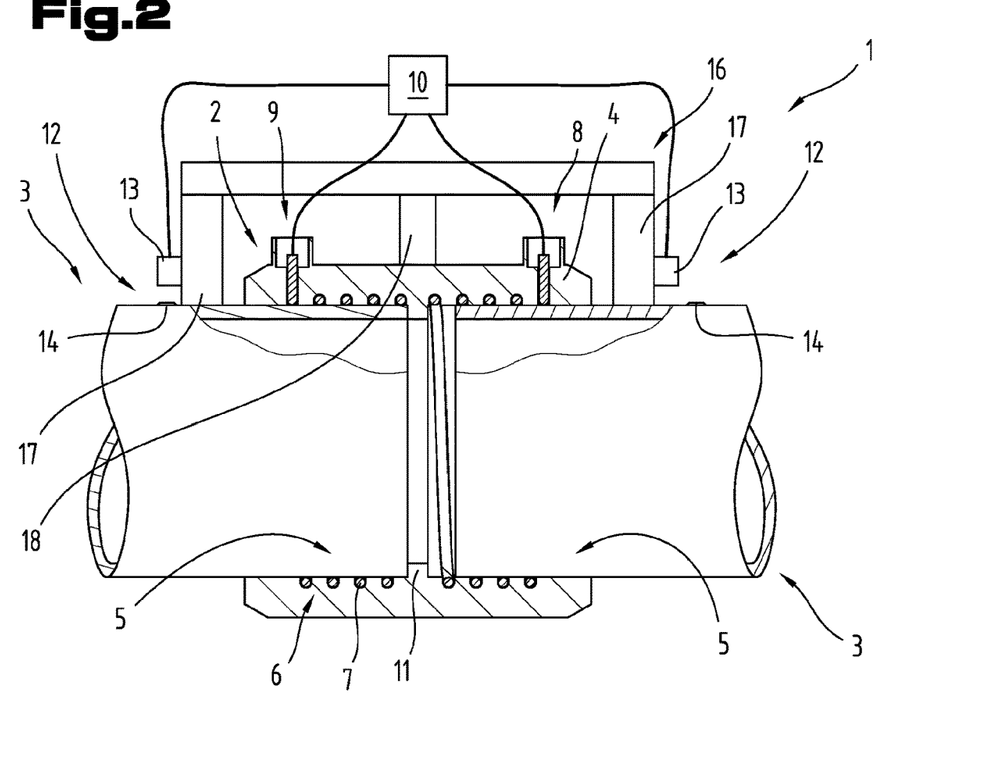
FIG. 2 a sectional view of a further exemplary embodiment of a connecting element with a sensor and a sensor counter-element, wherein a joining device is provided.

FIG. 2 shows a further and possibly independent embodiment of the welding assembly 1, wherein again, equal reference numbers/component designations are used for equal parts as before in FIG. 1. In order to avoid unnecessary repetitions, it is pointed to/reference is made to the detailed description in FIG. 1 preceding it.

As can be seen in FIG. 2, it may be provided that a joining device 16 is formed, which serves to accommodate the line elements 3 and/or the connecting element 2. The joining device 16 may comprise clamping elements 17, which serve to hold and/or position the line elements 3. Furthermore, the joining device 16 may comprise clamping elements 18, which serve to hold and/or of positioning the connecting element 2.

As can be seen in FIG. 2, it may be provided that the sensors 13 of the joining control 12 are each arranged on the clamping elements 17 for the line elements 3, wherein the function of the joining control 12 may take place mutatis mutandis to the exemplary embodiment of FIG. 1.

The exemplary embodiment described in FIG. 2 entails the advantage that the sensors 13 may remain fixedly on the joining device 16.

Figure 3:
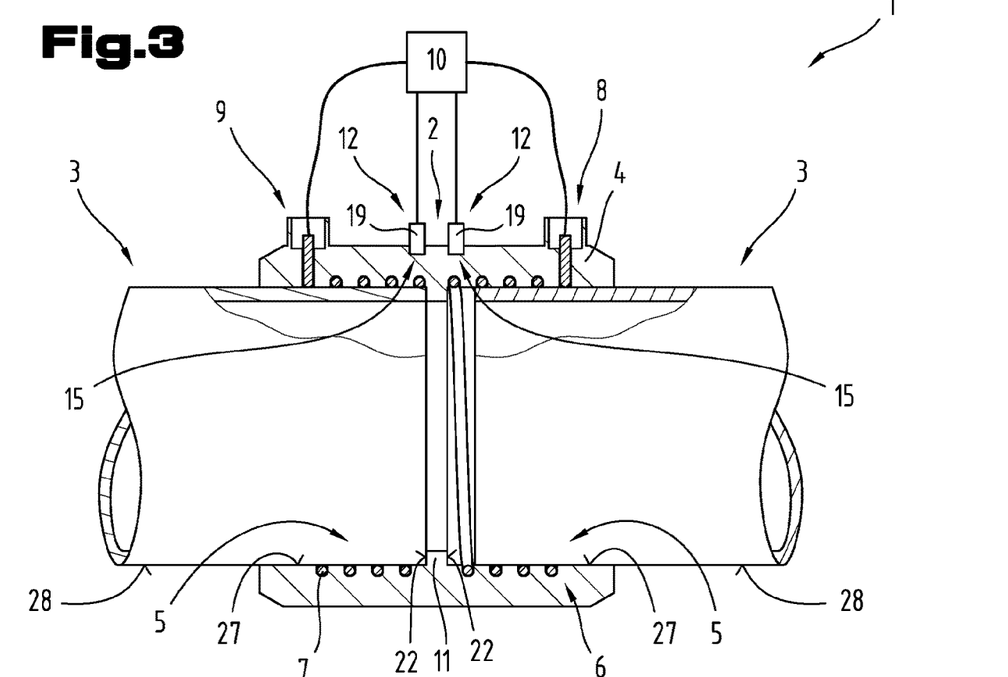
FIG. 3 a sectional view of a further exemplary embodiment of a connecting element with an ultrasonic sensor.

FIG. 3 shows a further and possibly independent embodiment of the welding assembly 1 wherein again, equal reference numbers and/or component designations are used for equal parts as in FIGS. 1 through 2 above. In order to avoid unnecessary repetitions, it is pointed to/reference is made to the detailed description in FIGS. 1 through 2 preceding it.

As can be seen in FIG. 3, it may be provided that the joining control 12 comprises one or multiple ultrasonic sensors 19, which may be arranged on corresponding shaped elements 15 on the connecting element 2. Using ultrasonic sensors 19 entails the advantage that they do not require a sensor counter-element 14 but that, given the correct positioning of the ultrasonic sensors 19, a correct connection between the connecting element 2 and the line elements 3 can be directly detected. Thus, it is not necessarily required when using such ultrasonic sensors 19 that the line elements 3 are provided with a sensor counter-element 14.

The ultrasonic sensors 19 may be arranged in the region of the stop 11 and serve to detect the wall thickness of the connecting element 2. As long as the line elements 3 are not correctly inserted into the connecting element 2, only the wall thickness of the connecting element 2 is detected. However, if the line elements 3 are correctly inserted into the connecting element 2, the ultrasonic sensor 19 detects a different wall thickness due to the wall thickness of the line elements 3, whereby a correct positioning of the line elements 3 relative to the connecting element 2 can be determined.

Instead of using two ultrasonic sensors 19, it is of course also conceivable that only one ultrasonic sensor 19 is formed, which may detect the correct positioning of the two line elements 3 relative to the connecting element 2 due to a larger detection area.

The individual ultrasonic sensors 19 may also be coupled to the welding device 10, in order to be able to carry out the welding dependent on the detection by the ultrasonic sensors 19.

Furthermore, it is also conceivable that the ultrasonic sensors 19 do not only serve to check the correct positioning of the connecting element 2 relative to the line elements 3, but that due to the changes in material properties in the connecting element 2 and/or in the line element 3, a correct progress of the welding can be detected, as well.

Here, as well, the ultrasonic sensors 19 may be removed from the connecting element 2 after conclusion of the welding process.

Figure 4:
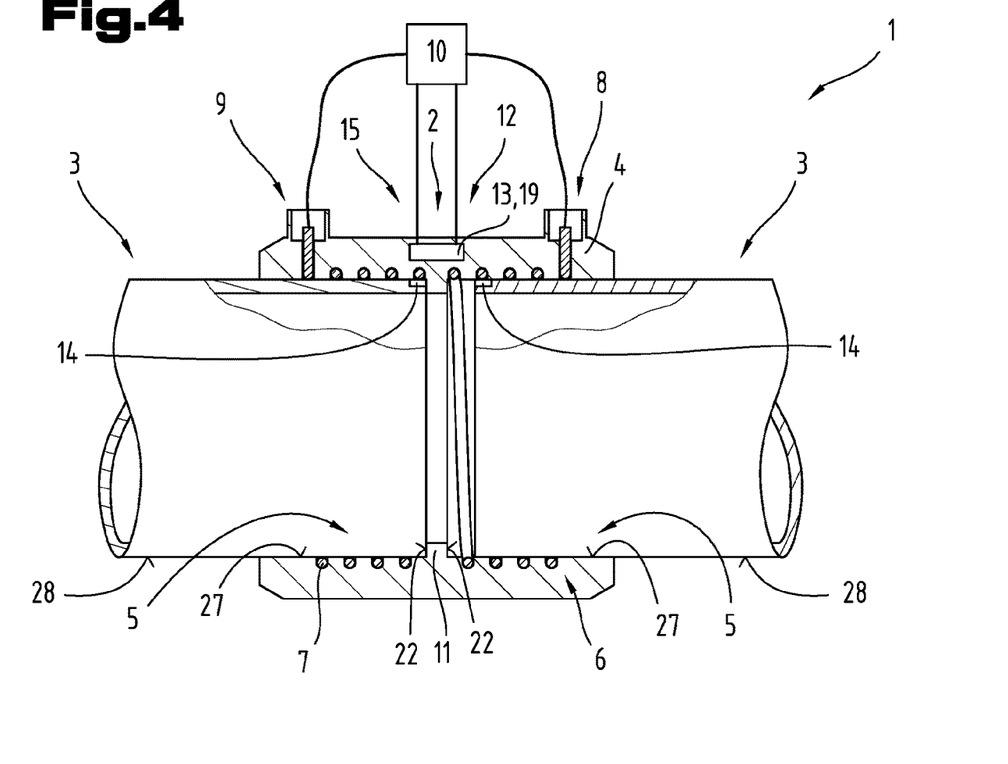
FIG. 4 a sectional view of a further exemplary embodiment of a connecting element with a sensor built into the connecting element.

FIG. 4 shows a further and possibly independent embodiment of the welding assembly 1 wherein again, equal reference numbers and/or component designations are used for equal parts as in FIGS. 1 through 3 above. In order to avoid unnecessary repetitions, it is pointed to/reference is made to the detailed description in FIGS. 1 through 3 preceding it.

As can be seen in FIG. 4, it may be provided that the sensor 13, 19 is embedded in the connecting element 2 and remains fixedly in the same. In the exemplary embodiment according to FIG. 4, it is of course also possible that optionally one sensor 13, 19 or a separate sensor for each of the line elements 3 could be provided.

Figure 5:
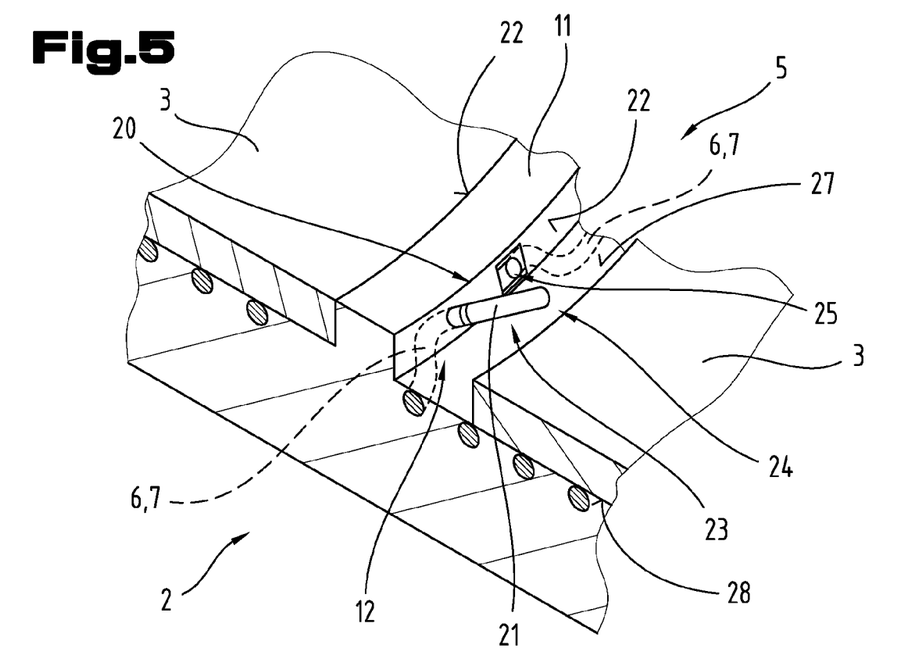
FIG. 5 a perspective detailed view of a further exemplary embodiment of a connecting element with a bridging element in the form of a spring element arranged in a web.

FIG. 5 shows a further and possibly independent embodiment of the welding assembly 1 wherein again, equal reference numbers and/or component designations are used for equal parts as in FIGS. 1 through 4 above. In order to avoid unnecessary repetitions, it is pointed to/reference is made to the detailed description in FIGS. 1 through 4 preceding it.

In FIG. 5, the connecting element 2 is shown in a perspective detailed view. Here, a detailed section from the vicinity of the stop 11 can be seen, in particular.

As can be seen from FIG. 5, it may be provided that the heating element 6, in particular the resistance heating wire 7, comprises an interruption 20. Furthermore, a bridging element 21 may be provided, which serves to bridge the interruption 20 and thus to close an electrically conductive connection in the heating element 6. In particular, it may be provided that the bridging element 21 is arranged on a front side 22 of the stop 11. Of course, it may be provided that on both front sides 22 of the stop 11, one such interruption 20 and/or a bridging element 21 each are formed, so that the correct joining of both line elements 3 can be detected.

As can be seen from FIG. 5, it may be provided that the bridging element 21 is configured in the form of a spring element 23, which forms a first contact 24 on its longitudinal end. Directly in the front side 22 of the stop 11, a second contact 25 may be formed. The second contact 25 is preferably configured such that it slightly protrudes relative to the front side 22 of the stop 11. In an un-installed state, the spring element 23 may be positioned in the stop 11, as shown in FIG. 4, such that the first contact 24 of the spring element 23 and the second contact 25 are spaced apart from one another. If the line element 3 is now inserted into the connecting element 2, a front side of the line element 3 pushes against the spring element 23, whereby the first contact 24 is pushed against the second contact 25. Thereby, the interruption 20 can be bridged in an electrically conductive manner, and the welding operation can be started.

Of course, it is conceivable that the spring element 23 is formed by a separate element, which is coupled to the resistance heating wire 7 in an electrically conductive manner. Alternatively, it is of course also conceivable that the spring element 23 is formed directly by the resistance heating wire 7.

Figure 6:
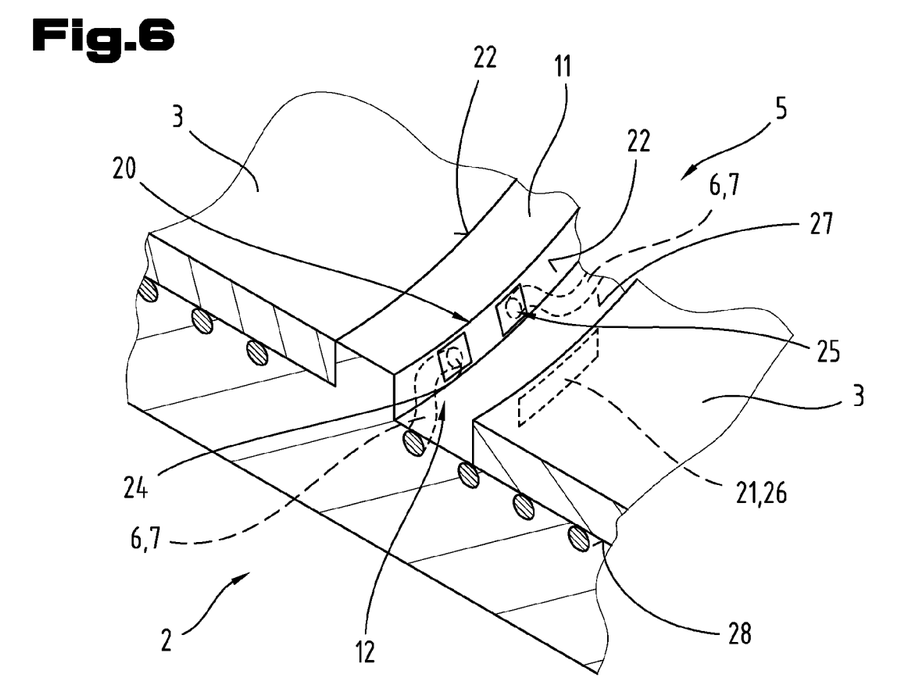
FIG. 6 a perspective detailed view of a further exemplary embodiment of a connecting element with a bridging element in the form of a material strip.

FIG. 6 shows a further and possibly independent embodiment of the welding assembly 1 wherein again, equal reference numbers and/or component designations are used for equal parts as in FIGS. 1 through 5 above. In order to avoid unnecessary repetitions, it is pointed to/reference is made to the detailed description in FIGS. 1 through 5 preceding it.

As can be seen from FIG. 6, it may be provided that the resistance heating wire 7 forms the interruption 20 on the front side 22 of the stop 11. In this regard, the first contact 24 may be formed on a side of the interruption 20 of the resistance heating wire 7, and the second contact 25 may be formed on a second side of the interruption 20 of the resistance heating wire 7.

In this exemplary embodiment, a material strip 26 made from an electrically conductive material serves as a bridging element 21. The material strip 26 is applied to a front side of the line element 3 and establishes, in a correctly connected state of the connecting element 2 and the line elements 3, an electrically conductive connection in the interrupted resistance heating wire 7. The material strip 26 may, for example, extend over a front-side circumferential segment of the line element 3. Alternatively, it is also conceivable that the material strip 26 extends on the front side over the entire circumference of the line element 3.

In an alternative embodiment variant, which is not shown, it may also be provided that mutatis mutandis to the exemplary embodiment according to FIG. 5, the resistance heating wire 7 is interrupted, wherein the first contact 24 and the second contact 25 are formed. However, in this regard, it may be provided that the two contacts 24, 25 are arranged on an inner jacket surface 27 of the welding area 5. In correspondence therewith, it may be provided that the material strip 26 is arranged on an outer jacket surface 28 of the line element 3. In this exemplary embodiment, which is not shown, the connection of the interruption 20 is also closed by the material strip 26 of the connecting element 2 and the line element 3 are correctly joined together.

Figure 7:
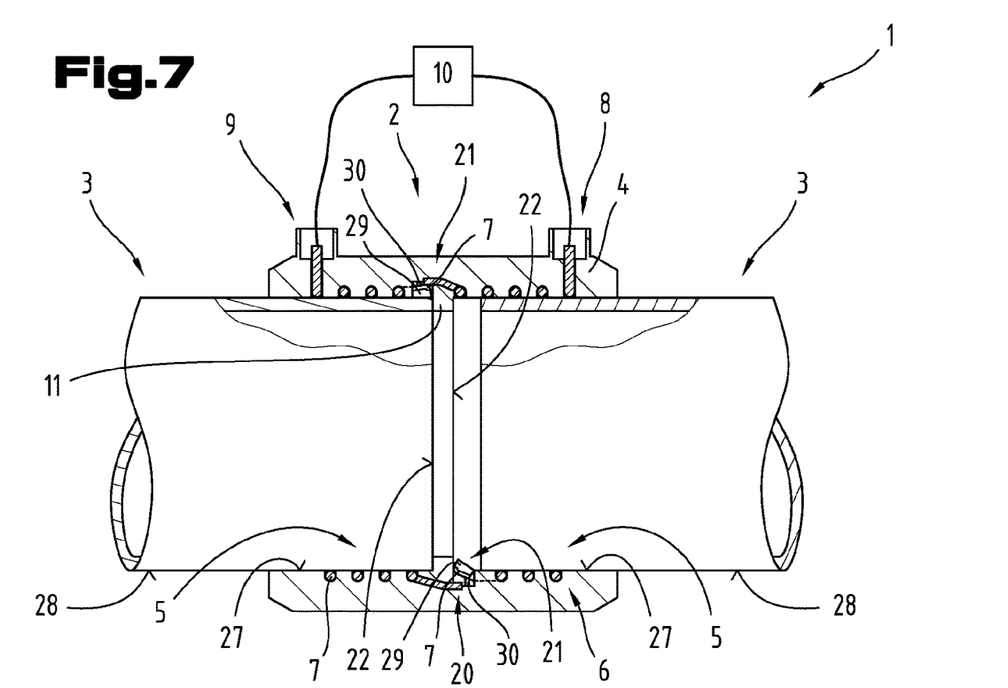
FIG. 7 a perspective detailed view of a further exemplary embodiment of a connecting element with a bridging element in the form of a spring element arranged in an inner jacket surface.

FIG. 7 shows a further and possibly independent embodiment of the welding assembly 1 wherein again, equal reference numbers and/or component designations are used for equal parts as in FIGS. 1 through 6 above. In order to avoid unnecessary repetitions, it is pointed to/reference is made to the detailed description in FIGS. 1 through 6 preceding it.

As can be seen from FIG. 7, it may be provided that the interruption 20 is formed in the region of the inner jacket surface 27 of the body 4. In this regard, it may be provided that the bridging element 21 has a structure similar to that of a contact switch. In particular, it may be provided that a contact element 29 is formed, which serves to rest on an outer jacket surface 28 of the line element 3. A part of the resistance heating wire 7, which part serves to create an electrically conductive bridging of the interruption 20, may be coupled to the contact element 29. Furthermore, a spring element 30 may be formed, which serves to open the contact on the interruption 20 as soon as the correct positioning of the connecting element 2 and the line elements 3 is disturbed.

Figure 8:
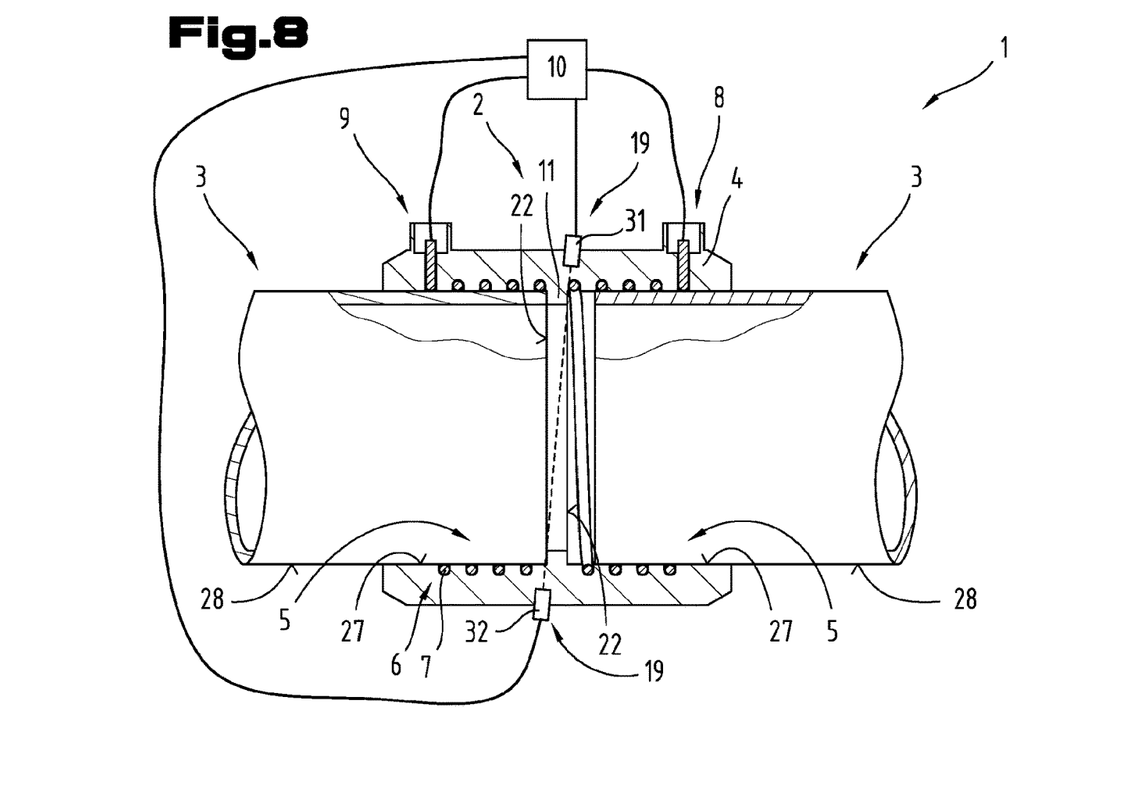
FIG. 8 a sectional view of a further exemplary embodiment of a connecting element with an ultrasonic sensor, which comprises a transmitter and a receiver arranged diagonally opposite.

FIG. 8 shows a further and possibly independent embodiment of the welding assembly 1 wherein again, equal reference numbers and/or component designations are used for equal parts as in FIGS. 1 through 7 above. In order to avoid unnecessary repetitions, it is pointed to/reference is made to the detailed description in FIGS. 1 through 7 preceding it.

As can be seen in FIG. 8, it may be provided that the ultrasonic sensor 19 of the joining control 12 comprises a transmitter 31 and a receiver 32, which are arranged diagonally opposite on the connecting element 2 and are simultaneously offset to one another. The transmitter 31 and the receiver 32 may, in this regard, be oriented to one another, such that both line elements 3 are located within the detection area of this ultrasonic sensor 19. Thus, the correct position of both line elements 3 can be determined with just one transmitter 31 and one receiver 32.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Welding assembly
2 Connecting element
3 Line element
4 Body
5 Welding area
6 Heating element
7 Resistance heating wire
8 First connection point
9 Second connection point
10 Welding device
11 Stop
12 Joining control
13 Sensor
14 Sensor counter-element
15 Shaped element
16 Joining device -continued

| | |
|---|---|
| 17 | Clamping element of the line element |
| 18 | Clamping element of the connecting element |
| 19 | Ultrasonic sensor |
| 20 | Interruption |
| 21 | Bridging element |
| 22 | Front side of the stop |
| 23 | Spring element |
| 24 | First contact |
| 25 | Second contact |
| 26 | Material strip |
| 27 | Inner jacket surface |
| 28 | Outer jacket surface of the line element |
| 29 | Contact element |
| 30 | Spring element |
| 31 | Transmitter |
| 32 | Receiver |

The invention claimed is:

1. A weldable connecting element for connecting or joining thermoplastic line elements, comprising:
a thermoplastic body;
at least one heating element, which is embedded in the body, wherein the heating element serves to generate heat in a welding area for welding the body to the at least one line element; and,
a joining control configured to prohibit the start of the welding operation and/or to interrupt the welding operation if the body is not correctly joined with the line element;
wherein the heating element is configured in the form of a resistance heating wire; and
wherein the joining control comprises an interruption in the resistance heating wire.

2. The connecting element according to claim 1, wherein the joining control further comprises a bridging element configured in the form of an electrically conductive spring element for closing the interruption, wherein the bridging element is arranged in the body such that the interruption is closed when the line element is correctly joined with the connecting element.

3. The connecting element according to claim 2, wherein a stop is formed in the body, wherein the stop serves as an insertion limit for the line element, wherein the electrically conductive spring element is arranged in the stop.

4. The connecting element according to claim 2, wherein the electrically conductive spring element arranged at an inner jacket surface of the welding area and acts in the radial direction.

5. The connecting element according to claim 1, wherein at least one shaped element is formed on the body and serves to accommodate a sensor of the joining control.

6. The connecting element according to claim 5, wherein the at least one shaped element comprises a recess.

7. The connecting element according to claim 1,
wherein the joining control further comprises a bridging element is for closing the interruption formed by a conductive material strip, which can be applied on the line element; and
wherein the bridging element is arranged in the body such that the interruption is closed when the line element is correctly joined with the connecting element.

8. The connecting element according to claim 7, wherein a stop is formed in the body, which stop serves as an insertion limit for the line element and has a first contact and a second contact offset in the circumferential direction, and the material strip can be applied on the front side of the line element and serves to electrically connect the first contact to the second contact.

9. The connecting element according to claim 1, wherein at least two shaped elements, which are axially spaced apart from one another, are formed on the body, each of which serves to accommodate a sensor of the joining control.

10. A welding assembly comprising:
at least one thermoplastic line element;
a connecting element, which has a thermoplastic body, wherein a heating element is embedded in the body, which serves to generate heat in a welding area for welding the body to the at least one line element;
a welding device for welding the connecting element to the at least one thermo-plastic line element; and
a joining control configured to prohibit the start of the welding operation and/or to interrupt the welding operation if the body is not correctly joined with the line element (3);
wherein the joining control comprises a sensor and a sensor counter-element, wherein the sensor counter-element is arranged or can be arranged on the line element.

11. The welding assembly according to claim 10,
wherein the sensor is arranged or can be arranged on the body of the connecting element; (2), and
wherein the sensor can be coupled to the welding device, and the welding device is configured to start and/or to carry out the welding operation dependent on a correct position of the sensor counter-element relative to the sensor.

12. The welding assembly according to claim 11, wherein the sensor is configured in the form of an RFID module, and wherein the sensor counter-element is configured in the form of an RFID tag.

13. The welding assembly according to claim 11, wherein the sensor is configured in the form of a Hall sensor, and wherein the sensor counter-element is configured in the form of a magnet element.

14. The welding assembly according to claim 11, wherein the sensor is configured in the form of an optical sensor, and wherein the sensor counter-element is configured in the form of a reflector.

15. The welding assembly according to claim 10, wherein the sensor comprises an ultrasonic sensor.

16. The connecting element according to claim 15, wherein the ultrasonic sensor is coupled to the welding device.

17. The welding assembly according to claim 10, wherein a joining device is formed, which serves to position the at least one line element relative to the connecting element, and wherein the sensor is arranged or can be arranged on the joining device, wherein the sensor can be coupled to the welding device, and the welding device is configured to start and/or to carry out the welding operation dependent on a correct positioning of the sensor counter-element relative to the sensor.

18. The welding assembly according to claim 10, wherein at least one shaped element is formed on the body to accommodate the sensor.

19. The welding assembly according to claim 10, wherein the joining control comprises at least two sensors, wherein at least two shaped elements are axially spaced apart from one another and are formed on the body, each shaped element of the at least two shaped elements accommodating a respective sensor of the at least two sensors.

20. A method for connecting or joining thermoplastic line elements with a connecting element, comprising the method steps:
- providing the at least one thermoplastic line element;
- providing the connecting element, which comprises a thermoplastic body, wherein a heating element configured in the form of a resistance heating wire is embedded in the body to generate heat in a welding area for welding the body to the at least one line element;
- joining the connecting element with the at least one thermoplastic line element;
- providing a welding device connected to the heating element for welding the connecting element to the at least one thermoplastic line element, wherein the welding device is coupled to a sensor of a joining control, wherein a correct connection of the connecting element and the line element is retrieved by the welding device using the sensor before a start of a welding operation and/or during the welding operation;
- welding the connecting element to the at least one thermoplastic line element by generating heat in the welding area using the welding device;
- wherein the joining control establishes a connection in an interruption of the resistance heating wire if the line element is correctly joined with the connecting element;
- wherein the welding device detects an interruption of the resistance heating wire and issues an error message; and
- wherein the welding operation is started or resumed only if the correct connection between the body and the at least one thermoplastic line element is determined by the joining control.

21. A welding assembly comprising:
- at least one thermoplastic line element;
- a connecting element, which has a thermoplastic body, wherein a heating element is embedded in the body, which serves to generate heat in a welding area for welding the body to the at least one line element;
- a welding device for welding the connecting element to the at least one thermo-plastic line element; and
- a joining control configured to prohibit the start of the welding operation and/or to interrupt the welding operation if the body is not correctly joined with the line element;
- wherein the joining control comprises a sensor coupled to the welding device; and
- wherein the correct connection of the connecting element and the line element is retrieved by the welding device using the sensor before the start of the welding operation and/or during the welding operation.

* * * * *